US010965859B2

(12) United States Patent
Lei

(10) Patent No.: US 10,965,859 B2
(45) Date of Patent: Mar. 30, 2021

(54) SMART WATCH-BASED MOBILE TERMINAL CAMERA CONTROL METHOD AND CONTROL SYSTEM

(71) Applicant: HUIZHOU TCL MOBILE COMMUNICATION CO., LTD., HuiZhou (CN)

(72) Inventor: Ming Lei, HuiZhou (CN)

(73) Assignee: HUIZHOU TCL MOBILE COMMUNICATION CO., LTD, Huizhou (CN)

( * ) Notice: Subject to any disclaimer, the term of this patent is extended or adjusted under 35 U.S.C. 154(b) by 0 days.

(21) Appl. No.: 16/349,990

(22) PCT Filed: Oct. 31, 2017

(86) PCT No.: PCT/CN2017/108697
§ 371 (c)(1),
(2) Date: May 15, 2019

(87) PCT Pub. No.: WO2018/090822
PCT Pub. Date: May 24, 2018

(65) Prior Publication Data
US 2019/0289192 A1   Sep. 19, 2019

(30) Foreign Application Priority Data

Nov. 16, 2016   (CN) .......................... 201611008413.X

(51) Int. Cl.
*H04N 5/232* (2006.01)
*H04M 1/72409* (2021.01)
(Continued)

(52) U.S. Cl.
CPC .... *H04N 5/23203* (2013.01); *H04M 1/72409* (2021.01); *H04M 1/72412* (2021.01);
(Continued)

(58) Field of Classification Search
CPC ....................... H04N 5/23203; H04M 1/72527
See application file for complete search history.

(56) References Cited

U.S. PATENT DOCUMENTS 9,618,970 B2   4/2017  Lee et al.
2016/0065831 A1*  3/2016  Howard ............. H04N 5/23293
                                                    348/211.2
(Continued)

FOREIGN PATENT DOCUMENTS

CN   104461290 A   3/2015
CN   105450848 A   3/2016
(Continued)

*Primary Examiner* — Christopher K Peterson
(74) *Attorney, Agent, or Firm* — Soroker Agmon Nordman

(57) ABSTRACT

Disclosed by the present invention is a smart watch-based mobile terminal camera control method and control system, the method comprising: detecting whether a mobile terminal has been connected to a smart watch when a camera of the mobile terminal is turned on; if yes, generating a camera control notification and sending the same to the smart watch; the smart watch receiving and displaying the camera control notification, and sending a camera control broadcast to the mobile terminal; and the mobile terminal controlling the camera to capture an image or record a video according to the camera control broadcast, and sending a preview of the captured image and recorded video to the smart watch.

19 Claims, 6 Drawing Sheets

(51) Int. Cl.
  *H04M 1/72412* (2021.01)
  *H04M 1/72415* (2021.01)
  *H04M 1/72439* (2021.01)
  *H04W 4/80* (2018.01)
  *H04N 7/01* (2006.01)
  *H04N 9/804* (2006.01)
  *H04N 5/77* (2006.01)

(52) U.S. Cl.
  CPC ... *H04M 1/72415* (2021.01); *H04M 1/72439* (2021.01); *H04N 5/232935* (2018.08); *H04N 7/0117* (2013.01); *H04W 4/80* (2018.02)

(56) References Cited

U.S. PATENT DOCUMENTS

2016/0085266 A1    3/2016   Lee et al.
2016/0212725 A1*   7/2016   Qiu ................... H04M 1/72527

FOREIGN PATENT DOCUMENTS

| CN | 106506838 A | 3/2017 |
| JP | 2009118474 A | 5/2009 |

\* cited by examiner

SMART WATCH-BASED MOBILE TERMINAL CAMERA CONTROL METHOD AND CONTROL SYSTEM

CROSS REFERENCE TO RELATED APPLICATION

This application is a US national phase application based upon an International Application No. PCT/CN2017/108697, filed on Oct. 31, 2017, which claims priority to Chinese Application No. 201611008413.X, filed on Nov. 16, 2016. The entire disclosures of the above applications are incorporated herein by reference.

BACKGROUND

1. Field of the Invention

The present disclosure relates to the field of the mobile terminal, and more particularly, to a method of controlling a camera of a mobile terminal by a smart watch and a controlling system.

2. Description of the Related Art

At present, a mobile terminal, such as a smartphone, is basically equipped with a camera and has functions of image capturing or video recording through icon buttons and function buttons on the mobile phone. These all require the user to operate on the smartphone. On the one hand, the operation may produce unclear images due to jitter. It is difficult for the user to take a self-portrait with a rear camera. Although the selfie stick solves this problem to a certain extent, it also has limit due to distance. There is also a dedicated wireless shutter device using the Bluetooth to deal with this problem, but some inconveniences such as additional equipment and no image return. Moreover, if image capturing and video recording of some camera programs are on the same interface, the self-timer or wireless shutter cannot realize the function of controlling the image capturing and video recording. Therefore, when the user is image capturing or video recording with the mobile terminal of the related art, the smartphone shakes easily during operation, resulting unclear images. Moreover, the image capturing or video recording in related art is limited by distance or needs to carry an extra Bluetooth device, which brings inconvenience to the user to capture images and record videos outdoors.

Therefore, the related art has yet to be improved and developed.

SUMMARY

Disclosed by the present disclosure is a smart watch-based mobile terminal camera control method and a control system. The problem of the related art is that the mobile terminal is not clear when image capturing or video recording because the smartphone is easy to shake during operation. Moreover, the image capturing or video recording in the related art is limited by distance or needs to carry an additional Bluetooth device, which brings inconvenience to the user in image capturing and video recording outdoors. The problem of the related art can be well dealt with in the present disclosure.

Disclosed by the present disclosure is a smart watch-based mobile terminal camera control method and control system. The user of the present disclosure can perform remote operation without additional equipment and does not need to arrange anything on the watch so that all standard smart watches can be supported. In other words, the smart watch-based mobile terminal camera control method and control system can be widely applied. The user can choose to record videos or capture images on the watch. After capturing images or recording videos, the user can also see the corresponding thumbnail on the watch, which is convenient for the user to get a clear image.

DESCRIPTION OF THE EMBODIMENTS

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

Figure 1:
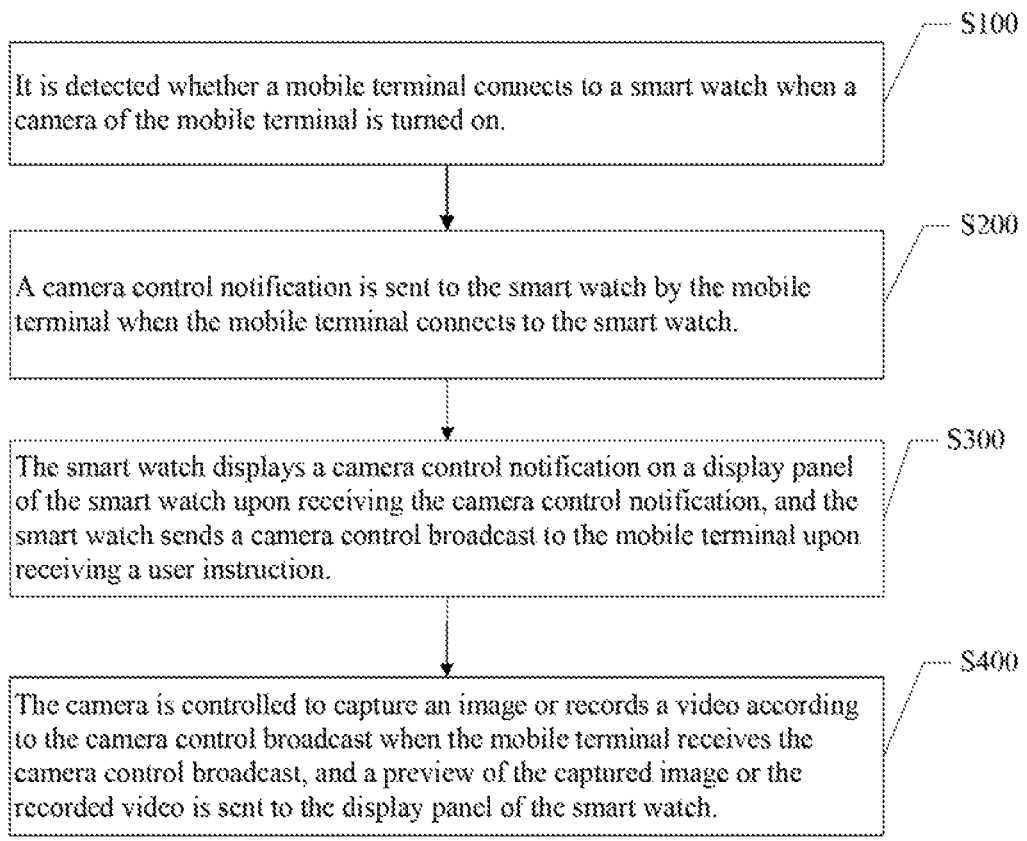
FIG. 1 illustrates a flowchart of a method of controlling a camera of a mobile terminal by a smart watch according to a first embodiment of the present disclosure.

FIG. 1 illustrates a flowchart of a method of controlling a camera of a mobile terminal by a smart watch according to a first embodiment of the present disclosure. The method includes Block S100, Block S200, Block S300, and Block S400.

At Block S100, it is detected whether a mobile terminal connects to a smart watch when a camera of the mobile terminal is turned on. The mobile terminal may be a smartphone or a tablet. Take a smartphone as an example. Further, take the smartphone using Android as an example. The smart watch is introduced as an example of a smart watch that is connected by a smartphone. The smart watch connects to the smartphone via androidear, and no extra programs are installed on the smart watch. The camera program in the smartphone determines whether it is connected to the smart watch upon being turned on.

In an application, Block S100 include Block S101.

At Block S101, whether the mobile terminal connects to the smart watch through the Bluetooth connection is detected when the camera of the mobile terminal is turned on.

In an application, the smartphone connects to the smart watch through the Bluetooth connection. It is unnecessary to install any camera-related programs on the smartphone in advance. The androidware program is necessarily installed on the smartphone to communicate with the smart watch through the androidware program.

At Block S200, a camera control notification is sent to the smart watch by the mobile terminal when the mobile terminal connects to the smart watch. If the smartphone connecting to the smart watch is detected, the smartphone generates a camera control notification after turning on the camera and sends the camera control notification to the smart watch so that the smart watch can get the camera control instruction in time. If the smartphone connects to the smart watch, a special notification is generated and sent out while the camera is turned on. This notification contains an extension action that can be received and recognized by a standard smartphone. The action includes an icon and the action of the smart watch after clicking on the icon (a specific broadcast will be sent to the smartphone). This notification can include two actions, one for controlling image capturing and the other one for controlling video recording. The androidear program in the smartphone sends this notification to the smart watch.

Specifically, Block S200 includes Block S201, Block S202, and Block S203.

At Block S201, an image capturing extension action and a video recording extension action are generated by using the mobile terminal when the mobile terminal connects to the smart watch through the Bluetooth connection.

At Block S202, the image capturing control notification and the video recording control notification are respectively generated by adding the image capturing extension action and the video recording extension action into the corresponding broadcast.

At Block S203, the image capturing control notification and the video recording control notification are sent to the smart watch through the Bluetooth connection by the mobile terminal.

In an application, when the camera program in the smartphone is opened, the camera program will issue a notification that the smart watch can recognize. Androidware will forward this notification to the smart watch. A notification message will appear in the smart watch. The notification includes two extension actions (NotificationCompat.Action) that can be recognized by the smart watch, that is, image capturing and video recording. The two extension actions correspond two interfaces in the smart watch.

At Block S300, the smart watch displays a camera control notification on a display panel of the smart watch upon receiving the camera control notification, and the smart watch sends a camera control broadcast to the mobile terminal upon receiving a user instruction. Upon receiving the camera control notification, the smart watch displays the camera control notification on the display panel of the smart watch. The user freely swipes to select different actions when an icon for any one of the actions is shown for click. Afterwards, the smart watch sends a specific broadcast via androidear and then the camera program receives the broadcast.

Specifically, Block S300 includes Block S301 and Block S302.

At Block S301, the smart watch displays the camera control notification and the video recording control notification on a display panel of the smart watch upon receiving the camera control notification and the video recording control notification.

At Block S302, the display panel of the smart watch sends the camera control broadcast or the camera control broadcast to the mobile terminal upon receiving a user's click.

When the notification main interface is displayed in the smart watch, the user can operate on the watch screen, and can be switched to the camera function interface and the video function interface by sliding. When the user slides the interface to the camera function interface, the user can click the image capturing icon on this interface. At this time, the watch will send an image capturing broadcast included in the image extension action to the smartphone through androidware.

At Block S400, the camera is controlled to capture an image or records a video according to the camera control broadcast when the mobile terminal receives the camera control broadcast, and a preview of the captured image or the recorded video is sent to the display panel of the smart watch.

When receiving the relevant broadcast, the camera program of the smartphone determines whether it is broadcast of the image capturing or broadcast of the video recording and then performs the corresponding operation and sends a preview image of the captured image or video recording to the display panel of the smart watch. The user can view the preview image of the captured image or video recording through the display panel of the smart watch. The preview image is a compressed thumbnail corresponding to the screen size and resolution of the smart watch.

In addition to Block S400, a step of removing the camera control notification from the mobile terminal when a program of the camera is closed is included.

Further, upon a condition that the camera control broadcast is sent to the mobile terminal by the smart watch in Block S302, Block S400 specifically includes Block S401, Block S402, and Block S403.

At Block S401, the camera is controlled to execute an image capturing instruction to capture the image after the mobile terminal receives the image capturing control broadcast.

At Block S402, the captured image is compressed according a display resolution of the smart watch to generate the preview of the captured image.

At Block S403, the preview of the captured image is sent to the display panel of the smart watch to display.

In an application, the smartphone controls to capture images upon receiving an image capturing broadcast. Then, the notification with the image captured as the background is updated after the image capturing, and a thumbnail of the captured image is seen on the watch. Upon receiving the broadcast, the camera in the smartphone captures images. When the camera is finished, the camera program generates a smaller thumbnail with the just captured image. And the background with the thumbnail is taken as an updated notification so that the just captured image can be displayed on the smart watch.

Further, upon a condition that the camera control broadcast is sent to the mobile terminal by the smart watch in Block S302, Block S400 specifically includes Block S411, Block S412, and Block S413.

At Block S411, the camera is controlled to record the video by the mobile terminal when the mobile terminal receives the video recording control broadcast.

At Block S412, the video is compressed according a display resolution of the smart watch to generate the preview of the video when the mobile terminal receives the video recording control broadcast again to control the camera to stop video recording.

At Block 413, the preview of the video is sent to the display panel of the smart watch to display.

In an application, if the smartphone receives a video broadcast and then controls to record videos. When the recording broadcast is received again, the video recording is stopped. The thumbnail of the image recording is used as a background update notification so that the thumbnail of the just recorded video can be viewed on the smart watch. When sliding the interface to the recording function interface, the user can click the recording icon on this interface. At this time, the smart watch will also send the video broadcast included in the video extension action to the smartphone through androidware. Upon receiving the broadcast, the camera in the smartphone starts recording. When the broadcast is received, it will stop recording. A small thumbnail will be generated from the video just recorded, and the notification will be updated as a background so that the image of the video just recorded will be displayed on the smart watch.

Figure 2:
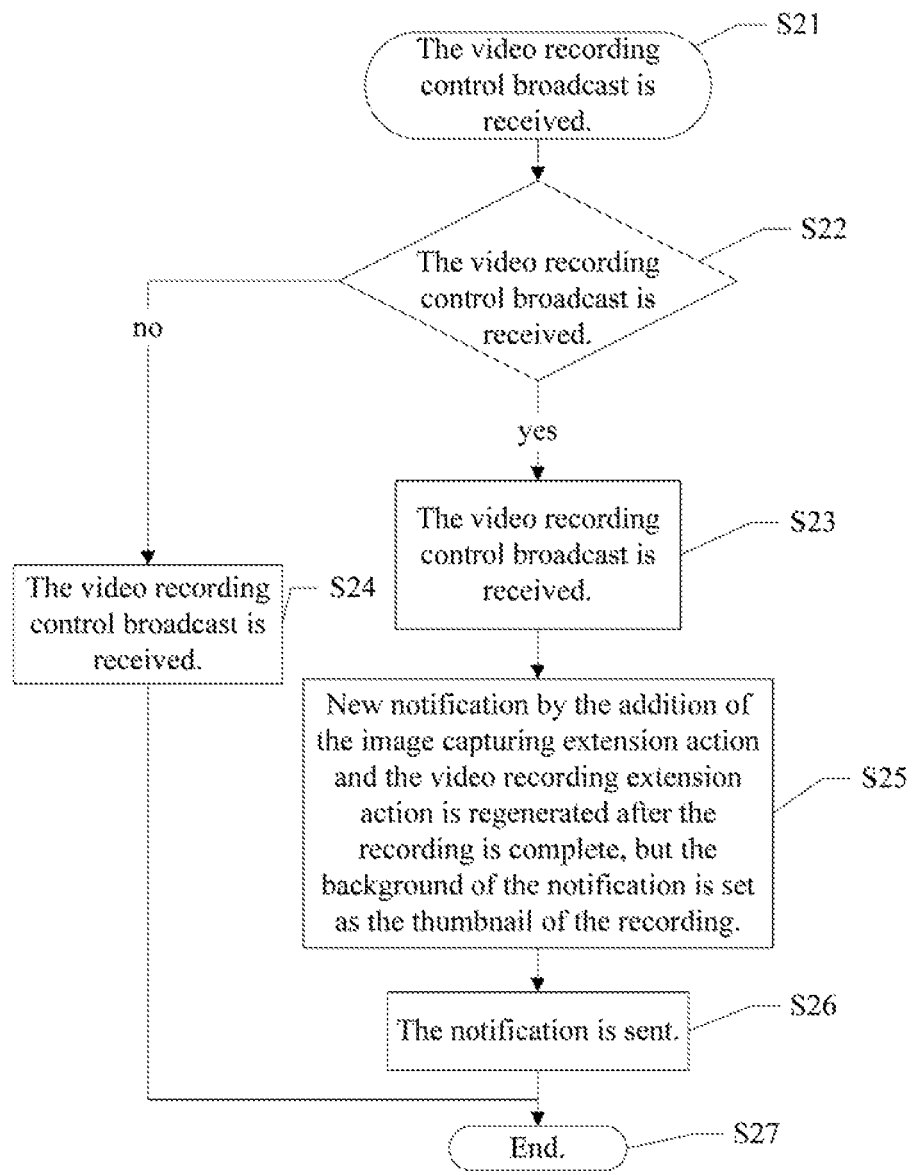
FIG. 2 illustrates a flowchart of a method of controlling a camera of a mobile terminal by a smart watch introduced in the first embodiment of the present disclosure.

Further, FIG. 2 illustrates a flowchart of a method of controlling a camera of a mobile terminal by a smart watch introduced in the first embodiment of the present disclosure. The method includes Block S1, Block S2, Block S3, Block S4, Block S5, Block S6, Block S7, Block S8, Block S9, and Block S10, At Block S1, the program of the camera is opened.

At Block S2, whether the camera control notification has been sent is determined, removing the camera control notification when the camera control notification has been sent;

At Block S3, an image capturing extension action is built, including an image shutter icon to be displayed on the smart watch and an image broadcast sent to the smart watch after clicking the shutter icon.

At Block S4, a video recording extension action is built, including an icon for displaying the video recording button on the smart watch and broadcast to the video recording sent by the smart watch after the icon is clicked.

At Block S5, an extended action list is added to the image capturing extension action and the video recording extension action.

At Block S6, a notification is created. An extended action list is added to the notification. The background of the notification is a fixed image.

At Block S7, the notification is sent.

At Block S8, a receiver for receiving image capturing and video recording broadcast is enabled.

At Block S9, other executions of opening the camera are performed.

At Block S10, the completion is achieved.

The camera program in the smartphone determines whether it is connected to the smart watch upon being turned on. If not, do not perform any operation with the smart watch.

Afterwards, image capturing control notification and video recording control notification are respectively generated. Different icons are used to indicate images and videos so that the user can easily understand the meaning of the icons. Moreover, the corresponding broadcast is added to the extension action.

A notification can be sent once the extension action is added to the notification so that the notification message can be displayed in the smart watch.

The background is now a default image. Of course, there is no images, but the user experience is better when there is a default background.

After the notification is sent, the receiver for receiving image capturing and video recording broadcasts is enabled so that the camera can receive the corresponding broadcast.

Figure 3:
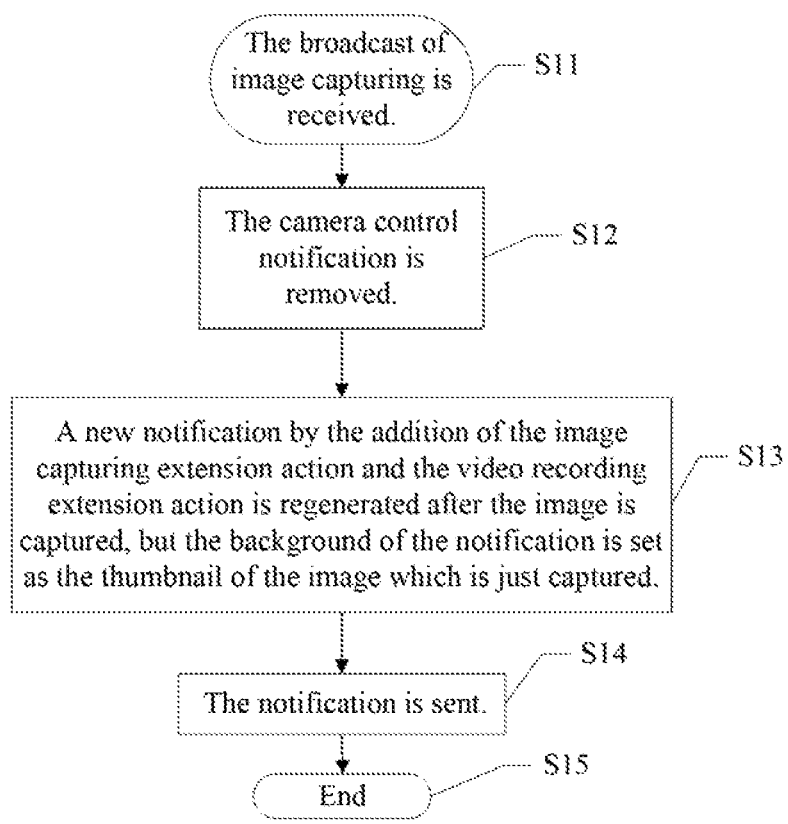
FIG. 3 illustrates a flowchart of receiving the execution of image capturing with the method of controlling a camera of a mobile terminal by a smart watch according to the second embodiment of the present disclosure.

Further, FIG. 3 illustrates a flowchart of receiving the execution of image capturing with the method of controlling a camera of a mobile terminal by a smart watch according to the second embodiment of the present disclosure. The method includes Block S11, Block S12, Block S13, Block S14, and Block S15.

At Block S11, the broadcast of image capturing is received.

At Block S12, an image capturing instruction is sent.

At Block S13, a new notification by the addition of the image capturing extension action and the video recording extension action is regenerated after the image is captured, but the background of the notification is set as the thumbnail of the image which is just captured.

At Block S14, the notification is sent.

At Block S15, the completion is achieved.

As can be seen from FIG. 3, after the image is captured, a new notification will be sent again. The notification at this time is basically the same as the notification of the opened camera in FIG. 2. However, the difference is that the image in the background has changed for the user to see the captured images on the watch's interface roughly.

Figure 4:
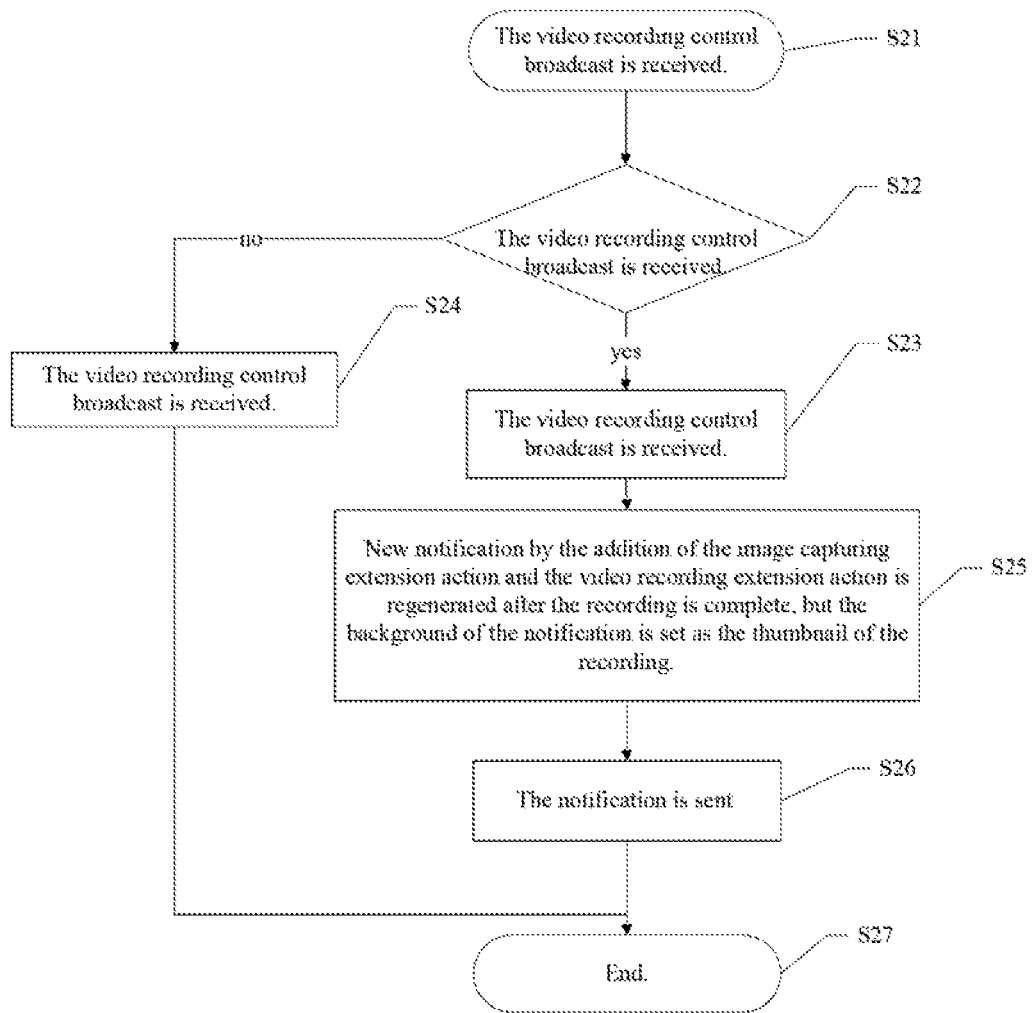
FIG. 4 illustrates a flowchart of reception of recording execution with the method of controlling a camera of a mobile terminal by a smart watch according to the second embodiment of the present disclosure.

Further, FIG. 4 illustrates a flowchart of reception of recording execution with the method of controlling a camera of a mobile terminal by a smart watch according to the second embodiment of the present disclosure. The method includes Block S21, Block S22, Block S23, Block S24, Block S25, Block S26, and Block S27.

At Block S21, the video recording control broadcast is received.

At Block S22, whether recording is executing is determined. If yes, execute Block S23; if not, execute Block S24.

At Block S23, the recording finishes.

At Block S24, the recording starts.

At Block S25, new notification by the addition of the image capturing extension action and the video recording extension action is regenerated after the recording is complete, but the background of the notification is set as the thumbnail of the recording.

At Block S26, the notification is sent.

At Block S27, the completion is achieved.

As can be seen from FIG. 3, after the image is captured, a new notification will be sent again. The notification at this time is basically the same as the notification of the opened camera in FIG. 2. However, the difference is that the image in the background has changed for the user to see the captured images on the watch's interface roughly.

Figure 5:
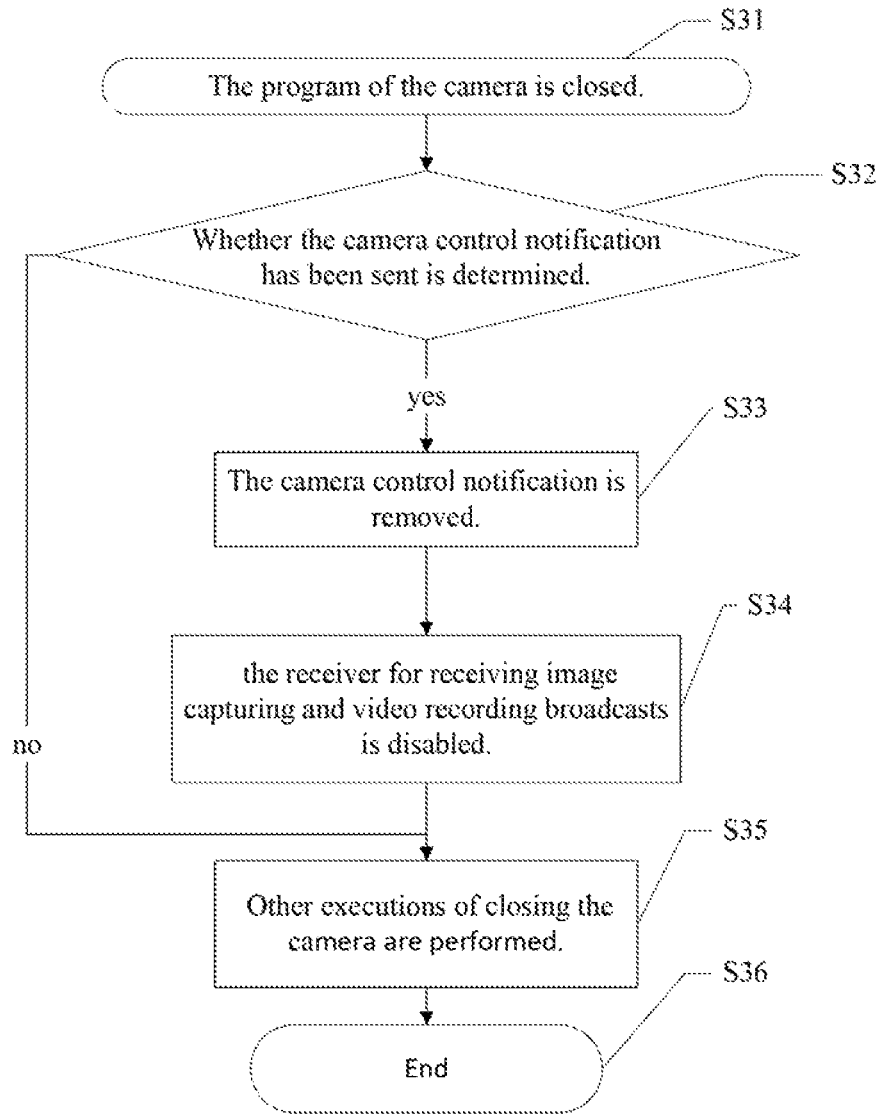
FIG. 5 illustrates a flowchart of closing the camera with the method of controlling a camera of a mobile terminal by a smart watch according to the second embodiment of the present disclosure.

Further, FIG. 5 illustrates a flowchart of closing the camera with the method of controlling a camera of a mobile terminal by a smart watch according to the second embodiment of the present disclosure. The method includes Block S31, Block S32, Block S33, Block S34, Block S35, and Block S36.

At Block S31, the program of the camera is closed.

At Block S32, whether the camera control notification has been sent is determined; if yes, go to Block S33; if not, go to Block S35.

At Block S33, the camera control notification is removed.

At Block S34, the receiver for receiving image capturing and video recording broadcasts is disabled.

At Block S35, other executions of closing the camera are performed.

At Block S36, the completion is achieved.

When the camera program is closed, the notification message in the smart watch is removed as well. If the camera program does not connect to the smart watch, no notifications appear when the camera is turned on, so it is not necessary to remove the notification message. If a notification is sent, the notification needs to be removed first. It is not necessary to receive a broadcast after the user clicks the icon so the broadcast receiver needs to be disabled.

Figure 6:
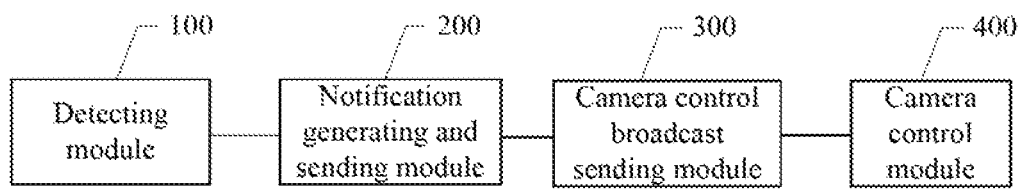
FIG. 6 illustrates a block diagram of a control system of controlling a camera of a mobile terminal by a smart watch according to an embodiment of the present disclosure.

With reference to FIG. 6, a control system of controlling a camera of a mobile terminal by a smart watch includes a detecting module 100, a notification generating and sending module 200, a camera control broadcast sending module 300, and a camera control module 400.

The detecting module 100 is configured to detect whether the mobile terminal connects to the smart watch when a camera of the mobile terminal is turned on. The operation of the detecting module 100 is similar to the method as introduced in the above embodiment according to the present disclosure.

The notification generating and sending module 200 is configured to send a camera control notification from the mobile terminal to the smart watch when the mobile terminal connects to the smart watch. The operation of the notification generating and sending module 200 is similar to the method as introduced in the above embodiment according to the present disclosure.

The camera control broadcast sending module 300 is configured to display the camera control notification on a display panel of the smart watch, and to send a camera control broadcast to the mobile terminal upon receiving a user instruction. The operation of the camera control broadcast sending module 300 is similar to the method as introduced in the above embodiment according to the present disclosure.

The camera control module 400 is configured to control the camera to capture an image or record a video according to the camera control broadcast upon receiving the camera control broadcast by the mobile terminal, and to send a preview of the captured image or the recorded video to the display panel of the smart watch.

The operation of the camera control module 400 is similar to the method as introduced in the above embodiment according to the present disclosure.

According to the control system, the detecting module 100 is also configured to detect whether the mobile terminal connects to the smart watch through a Bluetooth connection when the camera of the mobile terminal is turned on. The operation of the detecting module 100 is similar to the method as introduced in the above embodiment according to the present disclosure.

According to the control system, the notification generating and sending module 200 comprises a detecting and extension action generating unit, a notification generating unit, and a notification sending unit.

The detecting and extension action generating unit is configured to generate an image capturing extension action and a video recording extension action by the mobile terminal when the mobile terminal connects the smart watch through the Bluetooth connection. The operation of the detecting and extension action generating unit is similar to the method as introduced in the above embodiment according to the present disclosure.

The notification generating unit is configured to respectively generating image capturing control notification and video recording control notification by adding the image capturing extension action and the video recording extension action into the camera control broadcast. The operation of the notification generating unit is similar to the method as introduced in the above embodiment according to the present disclosure.

The notification sending unit is configured to send the image capturing control notification and the video recording control notification to the smart watch through the Bluetooth connection by the mobile terminal. The operation of the notification sending unit is similar to the method as introduced in the above embodiment according to the present disclosure.

According to the control system, the camera control broadcast sending module 300 comprises a notification displaying unit and a broadcast sending unit.

The notification displaying unit is configured to display the image capturing control notification and the video recording control notification on the display panel of the smart watch. The operation of the notification displaying unit is similar to the method as introduced in the above embodiment according to the present disclosure.

The broadcast sending unit is configured to send an image capturing control broadcast or a video recording control broadcast to the mobile terminal in response to a tapping operation from a user applied on the display panel of the smart watch. The operation of the broadcast sending unit is similar to the method as introduced in the above embodiment according to the present disclosure.

The camera control module comprises an image capturing control unit, a first preview generating unit, a first preview sending unit, a video recording control unit, a second preview generating unit, and a second preview sending unit.

The image capturing control unit is configured to control the camera to execute an image capturing instruction to capture the image by the mobile terminal upon receiving the image capturing control broadcast. The operation of the image capturing control unit is similar to the method as introduced in the above embodiment according to the present disclosure.

The first preview generating unit is configured to compress the captured image according a display resolution of the smart watch to generate the preview of the captured image. The operation of the first preview generating unit is similar to the method as introduced in the above embodiment according to the present disclosure.

The first preview sending unit configured to send the preview of the captured image to the display panel of the smart watch to display. The operation of the first preview sending unit is similar to the method as introduced in the above embodiment according to the present disclosure.

The video recording control unit is configured to control the camera to record the video upon receiving the video recording control broadcast by the mobile terminal. The operation of the video recording control unit is similar to the method as introduced in the above embodiment according to the present disclosure.

The second preview generating unit is configured to compress the video according a display resolution of the smart watch to generate the preview of the video when the mobile terminal receives the video recording control broadcast again to control the camera to stop video recording. The operation of the second preview generating unit is similar to the method as introduced in the above embodiment according to the present disclosure.

The second preview sending unit is configured to send the preview of the video to the display panel of the smart watch to display. The operation of the second preview sending unit is similar to the method as introduced in the above embodiment according to the present disclosure.

In conclusion, the present disclosure proposes a method of controlling a camera of a mobile terminal by a smart watch. The method includes: detecting whether a mobile terminal connects to a smart watch when a camera of the mobile terminal is turned on; sending a camera control notification to the smart watch by the mobile terminal when the mobile terminal connects to the smart watch; displaying the camera control notification on a display panel of the smart watch, and sending a camera control broadcast to the mobile terminal upon receiving an user instruction; and controlling the camera to capture an image or record a video according to the camera control broadcast upon receiving the camera control broadcast by the mobile terminal, and sending a preview of the captured image or the recorded video to the display panel of the smart watch. The user of the present disclosure can perform remote operation without additional equipment and does not need to arrange anything on the watch so that all standard smart watches can be supported. In other words, the smart watch-based mobile terminal camera control method and control system can be widely applied. The user can choose to record videos or capture images on the watch. After capturing images or recording videos, the user can also see the corresponding thumbnail on the watch, which is convenient for the user to get a clear image.

According to another embodiment of the present disclosure, a storage medium storing a plurality of program instructions, that are executable by a computer to perform the method of controlling a camera of a mobile terminal by a smart watch as disclosed in the above embodiment, is provided.

If the function is realized as a software functional unit and used or sold as a standalone product, it may be stored in a computer-readable storage medium. Based on such understanding, the technical solutions of the present disclosure per se, or its contribution to the related art, or the technical solution may be realized in a software product. The computer software product is stored in a storage medium, including several commands that enable a computer device (may be a personal computer, a server, or network device) to perform all or part of the steps of the methods of the various embodiments of the present disclosure. The storage medium includes U-disk, removable hard disk, read-only memory (ROM), random access memory (RAM), magnetic disk or compact disc (CD) and other medium that can store program codes.

Figure 7:
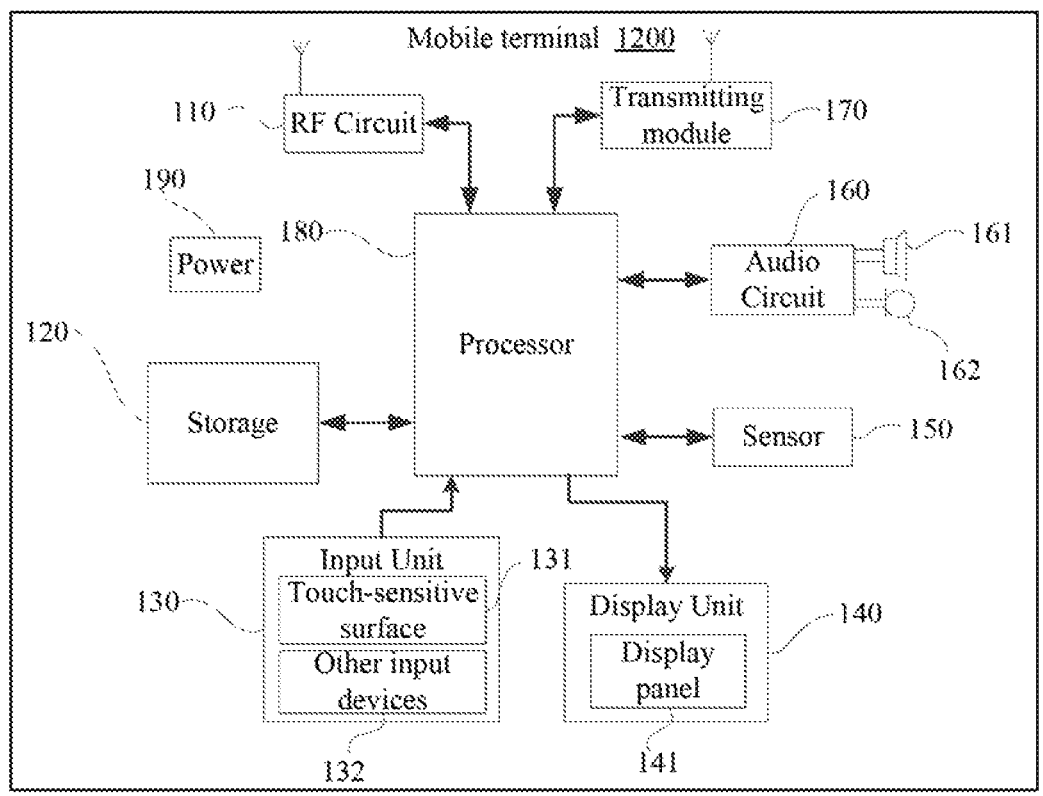
FIG. 7 illustrates a block diagram of a mobile terminal according to an embodiment of the present disclosure.

FIG. 7 is a block diagram of a mobile terminal according to one embodiment of the present invention. The mobile terminal for performing the method and the control system as provided in the above embodiments. The mobile terminal 1200 includes a mobile phone and a tablet personal computer (PC).

As shown in FIG. 7, the mobile terminal 1200 includes a RF (i.e., radio frequency) circuit 110, a memory 120 that includes one or more computer-readable storage medium, an input unit 130, a display unit 140, a sensor 150, an audio circuit 160, a WiFi (i.e., wireless fidelity) module 170, one or more processors 180 that includes one or more processing cores, and a power supply 190. As a person skilled in the art is aware, the mobile terminal 1200 may include fewer or more elements illustrated in FIG. 7, or a combination of some elements, or different element configuration.

For example, the RF circuit 110 is configured to send/receive electromagnetic wave, to convert electromagnetic wave into electrical signal and to convert electrical signals into electromagnetic wave so as to communicate with communication device or other equipment. The RF circuit 110 receives a base station's downlink information, delivers to the processors 180 for processing, and sends uplink data to the base station. For example, the RF circuit 110 includes an antenna, at least one amplifier, a tuner, one or several oscillators, Subscriber Identity Module (SIM) card, a transceiver, a coupler, a Low Noise Amplifier (LNA) and a duplexer. In another example, the RF circuit 110 communicates with the network and other equipment via wireless communication based on any communication standard or protocols, such as GSM (Global System of Mobile communication), EDGE (Enhanced Data GSM Environment), WCDMA (Wideband Code Division Multiple Access), CDMA (Code Division Multiple Access), Time Division Multiple Access (TDMA), Wireless Fidelity (Wi-Fi), IEEE 802.1 La, IEEE 802.11b, IEEE 802.11g, IEEE 802.11n, Voice over Internet Protocol (VoIP), and Worldwide Interoperability for Microwave Access (Wi-Max), SMS (Short Messaging Service), and any other protocols for email, instant communication.

The memory 120 is configured to store software programs and/or modules. The processor 180 can execute various applications and data processing functions included in the software programs and/or modules stored in the memory 120. The memory 120 includes, for example, a program storage area and a data storage area. The program storage area is configured to store, for example, an operating system and application programs. The data storage area is configured to store data received and/or generated during the use of the mobile terminal 1200 (e.g., version numbers, parameter values, etc.). The memory 120 can include one or more high-speed RAM, non-volatile memory such as a disk storage device and a flash memory device, a non-volatile random access memory (NVRAM), and/or other volatile solid state memory devices. In some embodiments, the memory 120 also includes memory controller configured to provide the processor 180 and the input module 130 with access to the memory 120.

The input module 130 is configured to receive input data and signals (e.g., data associated with software configuration, updated values of software configuration parameters) and also generate signals caused by operations and manipulations of input devices such as, for example, a user's finger, a touch pen, a keyboard, a mouse, etc. Specifically, the input module 130 includes a touch-sensitive surface 131 (also known as touch screen or touchpad) and at least one other input device 132. The touch-sensitive surface 131 is configured to collect touch operations on or near the touch-sensitive surface 131 that are performed by a user of the mobile terminal 1200, such as operations performed by the user using a finger, stylus, touch pen, or any other suitable object or attachment on or near the touch-sensitive surface 131. In some embodiments, the touch-sensitive surface 131 can optionally include a touch detection apparatus and a touch controller (not shown in FIG. 10). The touch detection apparatus can detect the direction of the touch operation and signals generated by the touch operation, and then transmit the signals to the touch controller. The touch controller can receive the signals from the touch detection apparatus, convert the signals into contact coordinate data, and then send the contact coordinate data to the processor 180. The touch controller can also receive and execute commands received from the processor 180. The touch-sensitive surface 131 can be implemented using various types of technologies such as, for example, resistive touch screen, capacitive touch screen, infrared ray touch screen, surface acoustic wave (SAW) touch screen, etc. The other input devices 132 can include, for example, a physical keyboard, a function key (such as a volume control key, a switch key, etc.), a trackball, a mouse, a joystick, etc.

The display module 140 is configured to display information entered by the user, information provided to the user, various graphical user interfaces (GUIs) of the mobile terminal 1200, and/or the like. The GUIs can include, for example, graph, text, icon, video, and/or any combination of them. The display module 140 includes a display panel 141, which can be, for example, a liquid crystal display (LCD), a light-emitting diode (LED) display, an organic light-emitting diode (OLED) display, etc. Furthermore, the touch-sensitive surface 131 can cover the display panel 141. After a touch operation on or near the touch-sensitive, surface 131 is detected, the touch-sensitive surface 131 transmits information of the touch operation to the processor 180, where the type and/or other information of the touch operation is determined. The processor 180 sends visual information to the display panel 141 based on the determined type of the touch operation. The visual information is then displayed on the display panel 141. Although shown in FIG. 7 as two separate components for the input and output functions respectively, in other embodiments, the touch-sensitive surface 131 and the display panel 141 can be integrated into one component for realization of the input and output functions.

The mobile terminal 1200 includes at least one sensor 150 such as, for example, a light sensor, a motion sensor, and/or other types of sensors. A light sensor can be, for example, an ambient light sensor or a proximity sensor. The ambient light sensor is configured to adjust the brightness of the display panel 141 according to the light intensity received at the ambient light sensor. The proximity sensor is configured to turn off the display panel 141 and/or backlight when the mobile terminal 1200 moves near the user's ear. A motion sensor can be, for example, an acceleration transducer that can measure acceleration at each direction (e.g., 3-axis directions), measure the magnitude and direction of gravity when stationary, be used in applications for recognition of the posture of the mobile terminal 1200 (e.g., horizontal and vertical screen switching, games, magnetometer posture calibration), be used in applications related to vibration recognition (e.g., pedometer, percussion), and/or the like. Additionally, although not shown in FIG. 10, the mobile terminal 1200 can also include other sensory devices such as, for example, a gyroscope, a barometer, a hygrometer, a thermometer, an infrared sensor, and/or the like.

The audio circuit 160, the speaker 161 and the microphone 162 collectively provide an audio interface between the user and the mobile terminal 1200. The audio circuit 160 transmits an electric signal converted from audio data to the speaker 161, where the electric signal is converted and output as an acoustical signal by the speaker 161. The microphone 162 converts a collected acoustical signal into an electric signal, which is then sent to and converted to audio data by the audio circuit 160. The audio data is sent to the processor 180 for further processing, and then sent to another terminal device through the RF circuit 110 or stored in the memory 120 for further processing. The audio circuit 160 can also include an earplug jack to enable communication between a peripheral headset and the mobile terminal 1200.

The Transmitting module 170 (e.g. Wi-Fi module) is configured to enable Wi-Fi communication between the mobile terminal 1200 and other devices or network. Thus, the module 170 provides the user with a wireless access to broadband Internet. As a result, the user can use the Wi-Fi connection to, for example, send and receive E-mails, browse web pages, access streaming media, and so on. Although shown in FIG. 7 as including the transmitting module 170, in some other embodiments, a terminal device can operate without the transmitting module 170.

The processor 180 functions as a control center of the mobile terminal 1200. The processor 180 is configured to operatively connect each component of the mobile terminal 1200 using various interfaces and circuits. The processor 180 is configured to execute the various functions of the mobile terminal 1200 and to perform data processing by operating and/or executing the software programs and/or modules stored in the memory 120 and using the data stored in the memory 120. In some embodiments, the processor 180 can include one or more processing cores. In some embodiments, an application processor and a modem processor can be integrated at the processor 180. The application processor is configured to monitor and control the operating system, user interfaces, application programs, and so on. The modem processor is configured to control wireless communication.

The power supply 190 is used to provide power for the various components of the mobile terminal 1200. The power supply 190 can be, for example, a battery. The power supply 190 can be operatively coupled to the processor 180 via a power management system that controls charging, discharging, power consumption, and/or other functions related to power management. In some embodiments, the power supply 190 can include one or more DC and/or AC power source, recharging system, power failure detection circuit, power converter or inverter, power supply status indicator, and/or the like.

Although not shown in FIG. 7, in some embodiments, the terminal device 10 can include, for example, a camera (e.g. a front camera and a rear camera), a Bluetooth module, and/or other suitable components. The mobile terminal 1200 can be configured to perform the software configuration updating procedures described above with respect to FIGS. 1-5. Specifically, instructions or code of the programs and/or modules stored in the memory 120, when executed at the processor 180, can perform the operations of the methods as described above with respect to FIGS. 1-5.

The operations include:

detecting whether a mobile terminal connects to a smart watch when a camera of the mobile terminal is turned on;

sending a camera control notification to the smart watch by the mobile terminal when the mobile terminal connects to the smart watch, so that the screen of the smart watch displays the camera control notification and the smart watch can transmit a camera control broadcast to the mobile terminal upon receiving a user instruction;

enabling a receiver for receiving the camera control broadcast;

controlling the camera to capture an image or record a video according to the camera control broadcast upon receiving the camera control broadcast by the mobile terminal, and sending a preview of the captured image or the recorded video to the display panel of the smart watch.

Furthermore, the operation of detecting whether a mobile terminal connects to a smart watch when a camera of the mobile terminal is turned on, comprises: detecting whether the mobile terminal connects to the smart watch through a Bluetooth connection when the camera of the mobile terminal is turned on.

Furthermore, the operation of sending a camera control notification to the smart watch by the mobile terminal when the mobile terminal connects to the smart watch, comprises:

generating an image capturing extension action and a video recording extension action by the mobile terminal when the mobile terminal connects the smart watch through the Bluetooth connection;

respectively generating image capturing control notification and video recording control notification by adding the image capturing extension action and the video recording extension action into the camera control broadcast; and sending the image capturing control notification and the video recording control notification to the smart watch through the Bluetooth connection by the mobile terminal.

Furthermore, upon a condition of sending the image capturing control broadcast to the mobile terminal in response to the tapping operation from the user applied on the display panel of the smart watch, the operations of controlling the camera to capture an image or record a video according to the camera control broadcast upon receiving the camera control broadcast by the mobile terminal, and sending a preview of the captured image or the recorded video to the display panel of the smart watch comprise:

controlling the camera to execute an image capturing instruction to capture the image by the mobile terminal upon receiving the image capturing control broadcast;

compressing the captured image according a display resolution of the smart watch to generate the preview of the captured image; and sending the preview of the captured image to the display panel of the smart watch to display.

Furthermore, upon a condition of sending the video recording control broadcast to the mobile terminal in response to the tapping operation from the user applied on the display panel of the smart watch, the operations of controlling the camera to capture an image or record a video according to the camera control broadcast upon receiving the camera control broadcast by the mobile terminal, and sending a preview of the captured image or the recorded video to the display panel of the smart watch comprise:

controlling the camera to record the video upon receiving the video recording control broadcast by the mobile terminal;

compressing the video according a display resolution of the smart watch to generate the preview of the video when the mobile terminal receives the video recording control broadcast again to control the camera to stop video recording; and sending the preview of the video to the display panel of the smart watch to display.

Furthermore, the processor also executes program instructions to perform following operation:

removing the camera control notification by the mobile terminal when a program of the camera is closed.

Furthermore, the operation of removing the camera control notification by the mobile terminal when a program of the camera is closed, comprises:

closing the program of the camera;

determining whether the camera control notification has been sent, removing the camera control notification when the camera control notification has been sent; and disabling the receiver for receiving image capturing and video recording broadcasts.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method of controlling a camera of a mobile terminal by a smart watch, comprising:

detecting whether a mobile terminal connects to a smart watch when a camera of the mobile terminal is turned on;

sending a camera control notification to the smart watch by the mobile terminal when the mobile terminal connects to the smart watch, so that the smart watch displays the camera control notification on a display panel of the smart watch upon receiving the camera control notification, and the smart watch sends a camera control broadcast to the mobile terminal upon receiving a user instruction;

enabling a receiver of the mobile terminal for receiving the camera control broadcast sent from the smart watch, wherein the camera control broadcast is an image capturing control broadcast or a video recording control broadcast; and controlling the camera to capture an image or record a video according to the camera control broadcast upon receiving the camera control broadcast by the mobile terminal, and sending a preview of the captured image or the recorded video to the display panel of the smart watch.

2. The method according to claim 1, wherein the step of detecting whether a mobile terminal connects to a smart watch when a camera of the mobile terminal is turned on, comprises:

detecting whether the mobile terminal connects to the smart watch through a Bluetooth connection when the camera of the mobile terminal is turned on.

3. The method according to claim 2, wherein the step of sending a camera control notification to the smart watch by the mobile terminal when the mobile terminal connects to the smart watch, comprises:

generating an image capturing extension action and a video recording extension action by using the mobile terminal when the mobile terminal connects to the smart watch through the Bluetooth connection;

respectively generating image capturing control notification and video recording control notification by adding the image capturing extension action and the video recording extension action into the camera control broadcast; and sending the image capturing control notification and the video recording control notification to the smart watch through the Bluetooth connection by the mobile terminal.

4. The method according to claim 1, wherein upon a condition that the camera control broadcast is the image capturing control broadcast, the steps of controlling the camera to capture an image or record a video according to the camera control broadcast upon receiving the camera control broadcast by the mobile terminal, and sending a preview of the captured image or the recorded video to the display panel of the smart watch, comprise:
  controlling the camera to execute an image capturing instruction to capture the image by the mobile terminal upon receiving the image capturing control broadcast;
  compressing the captured image according a display resolution of the smart watch to generate the preview of the captured image; and
  sending the preview of the captured image to the display panel of the smart watch to display.

5. The method according to claim 1, wherein upon a condition that the camera control broadcast is the video recording control broadcast, the steps of controlling the camera to capture an image or record a video according to the camera control broadcast upon receiving the camera control broadcast by the mobile terminal, and sending a preview of the captured image or the recorded video to the display panel of the smart watch, comprise:
  controlling the camera to record the video by the mobile terminal upon receiving the video recording control broadcast;
  compressing the video according a display resolution of the smart watch to generate the preview of the video when the mobile terminal receives the video recording control broadcast again to control the camera to stop video recording; and
  sending the preview of the video to the display panel of the smart watch to display.

6. The method according to claim 1, further comprising:
  removing the camera control notification from the mobile terminal when a program of the camera is closed.

7. The method according to claim 6, wherein the step of removing the camera control notification from the mobile terminal when a program of the camera is closed, comprises:
  closing the program of the camera;
  removing the camera control notification when the camera control notification has been sent; and
  disabling the receiver.

8. A method of controlling a camera of a mobile terminal by a smart watch, comprising:
  detecting whether a mobile terminal connects to a smart watch when a camera of the mobile terminal is turned on;
  sending a camera control notification to the smart watch by the mobile terminal when the mobile terminal connects to the smart watch;
  displaying the camera control notification on a display panel of the smart watch, and sending a camera control broadcast to the mobile terminal upon receiving an user instruction; and
  controlling the camera to capture an image or record a video according to the camera control broadcast upon receiving the camera control broadcast by the mobile terminal, and sending a preview of the captured image or the recorded video to the display panel of the smart watch.

9. The method according to claim 8, wherein the step of detecting whether a mobile terminal connects to a smart watch when a camera of the mobile terminal is turned on, comprises:
  detecting whether the mobile terminal connects to the smart watch through a Bluetooth connection when the camera of the mobile terminal is turned on.

10. The method according to claim 9, wherein the step of sending a camera control notification to the smart watch by the mobile terminal when the mobile terminal connects to the smart watch, comprises:
  generating an image capturing extension action and a video recording extension action by the mobile terminal when the mobile terminal connects the smart watch through the Bluetooth connection;
  respectively generating image capturing control notification and video recording control notification by adding the image capturing extension action and the video recording extension action into the camera control broadcast; and
  sending the image capturing control notification and the video recording control notification to the smart watch through the Bluetooth connection by the mobile terminal.

11. The method according to claim 10, wherein the step of displaying the camera control notification on a display panel of the smart watch, and sending a camera control broadcast to the mobile terminal upon receiving a user instruction, comprises:
  displaying the image capturing control notification and the video recording control notification on the display panel of the smart watch; and
  sending an image capturing control broadcast or a video recording control broadcast to the mobile terminal in response to a tapping operation from a user applied on the display panel of the smart watch.

12. The method according to claim 11, wherein upon a condition of sending the image capturing control broadcast to the mobile terminal in response to the tapping operation from the user applied on the display panel of the smart watch, the steps of controlling the camera to capture an image or record a video according to the camera control broadcast upon receiving the camera control broadcast by the mobile terminal, and sending a preview of the captured image or the recorded video to the display panel of the smart watch comprise:
  controlling the camera to execute an image capturing instruction to capture the image by the mobile terminal upon receiving the image capturing control broadcast;
  compressing the captured image according a display resolution of the smart watch to generate the preview of the captured image; and
  sending the preview of the captured image to the display panel of the smart watch to display.

13. The method according to claim 11, wherein upon a condition of sending the video recording control broadcast to the mobile terminal in response to the tapping operation from the user applied on the display panel of the smart watch, the steps of controlling the camera to capture an image or record a video according to the camera control broadcast upon receiving the camera control broadcast by the mobile terminal, and sending a preview of the captured image or the recorded video to the display panel of the smart watch comprise:
  controlling the camera to record the video upon receiving the video recording control broadcast by the mobile terminal;
  compressing the video according a display resolution of the smart watch to generate the preview of the video when the mobile terminal receives the video recording control broadcast again to control the camera to stop video recording; and
  sending the preview of the video to the display panel of the smart watch to display.

14. The method according to claim 8, further comprising:
  removing the camera control notification by the mobile terminal when a program of the camera is closed.

15. The method according to claim 14, wherein the step of removing the camera control notification by the mobile terminal when a program of the camera is closed, comprises:
closing the program of the camera;
removing the camera control notification when the camera control notification has been sent; and
disabling the receiver.

16. A control system of controlling a camera of a mobile terminal by a smart watch, comprising:
one or a plurality of processors;
a memory; and
one or a plurality of application programs, stored in the memory and executable by the processor;
wherein the one or the plurality of application programs comprises:
a detecting module, configured to detect whether the mobile terminal connects to the smart watch when a camera of the mobile terminal is turned on;
a notification generating and sending module, configured to send a camera control notification from the mobile terminal to the smart watch when the mobile terminal connects to the smart watch;
a camera control broadcast sending module, configured to display the camera control notification on a display panel of the smart watch, and to send a camera control broadcast to the mobile terminal upon receiving a user instruction;
a camera control module, configured to control the camera to capture an image or record a video according to the camera control broadcast upon receiving the camera control broadcast by the mobile terminal, and to send a preview of the captured image or the recorded video to the display panel of the smart watch.

17. The control system according to claim 16, wherein the detecting module is configured to detect whether the mobile terminal connects to the smart watch through a Bluetooth connection when the camera of the mobile terminal is turned on.

18. The control system according to claim 17, wherein the notification generating and sending module comprises:
a detecting and extension action generating unit, configured to generate an image capturing extension action and a video recording extension action by the mobile terminal when the mobile terminal connects the smart watch through the Bluetooth connection;
a notification generating unit, configured to respectively generating image capturing control notification and video recording control notification by adding the image capturing extension action and the video recording extension action into the camera control broadcast; and
a notification sending unit configured to send the image capturing control notification and the video recording control notification to the smart watch through the Bluetooth connection by the mobile terminal.

19. The control system according to claim 18, wherein the camera control broadcast sending module comprises:
a notification displaying unit, configured to display the image capturing control notification and the video recording control notification on the display panel of the smart watch;
a broadcast sending unit configured to send an image capturing control broadcast or a video recording control broadcast to the mobile terminal in response to a tapping operation from a user applied on the display panel of the smart watch;
wherein the camera control module comprises:
an image capturing control unit configured to control the camera to execute an image capturing instruction to capture the image by the mobile terminal upon receiving the image capturing control broadcast;
a first preview generating unit configured to compress the captured image according a display resolution of the smart watch to generate the preview of the captured image;
a first preview sending unit configured to send the preview of the captured image to the display panel of the smart watch to display;
a video recording control unit configured to control the camera to record the video upon receiving the video recording control broadcast by the mobile terminal;
a second preview generating unit configured to compress the video according a display resolution of the smart watch to generate the preview of the video when the mobile terminal receives the video recording control broadcast again to control the camera to stop video recording; and
a second preview sending unit configured to send the preview of the video to the display panel of the smart watch to display.

* * * * *